(12) United States Patent
Heller

(10) Patent No.: US 11,954,958 B2
(45) Date of Patent: Apr. 9, 2024

(54) ACCESS AND USE CONTROL SYSTEM

(71) Applicant: Good2Go, Inc., San Francisco, CA (US)

(72) Inventor: Frances Heller, San Francisco, CA (US)

(73) Assignee: Good2Go, Inc., San Francisco, CA (US)

( * ) Notice: Subject to any disclaimer, the term of this patent is extended or adjusted under 35 U.S.C. 154(b) by 0 days.

(21) Appl. No.: 18/078,771

(22) Filed: Dec. 9, 2022

(65) Prior Publication Data

US 2023/0186708 A1 Jun. 15, 2023

Related U.S. Application Data

(60) Provisional application No. 63/288,242, filed on Dec. 10, 2021.

(51) Int. Cl.
*G07C 9/29* (2020.01)
*G06K 7/10* (2006.01)
*G06K 7/14* (2006.01)

(52) U.S. Cl.
CPC ............ *G07C 9/29* (2020.01); *G06K 7/10722* (2013.01); *G06K 7/1417* (2013.01)

(58) Field of Classification Search
CPC ........ G07C 9/29; G07C 9/00817; G07C 9/00; G07C 9/00896; G07C 9/10; G07C 9/21; G07F 17/12; G07F 17/13; G07F 5/26; G07F 17/0021
See application file for complete search history.

(56) References Cited

U.S. PATENT DOCUMENTS

| | | | | |
|---|---|---|---|---|
| 8,195,227 | B1* | 6/2012 | Bushman | H04M 1/72412 398/28 |
| 8,340,726 | B1* | 12/2012 | Fujisaki | G06F 3/165 345/169 |
| 9,432,298 | B1* | 8/2016 | Smith | H04L 49/9057 |
| 9,524,594 | B2* | 12/2016 | Ouyang | G07C 9/27 |
| 11,227,456 | B1* | 1/2022 | Carter | G07C 9/00896 |
| 11,233,860 | B1* | 1/2022 | Gant | G07C 9/00904 |
| 11,615,667 | B2* | 3/2023 | Gokcebay | G07C 9/00944 232/24 |
| 11,900,744 | B2* | 2/2024 | Raduchel | G07C 9/00571 |
| 2013/0119129 | A1* | 5/2013 | Amdahl | G06Q 20/4014 235/382.5 |

(Continued)

*Primary Examiner* — Daniel I Walsh
(74) *Attorney, Agent, or Firm* — Frost Brown Todd LLP; Vance V. VanDrake, III; Alexander J. Johnson

(57) ABSTRACT

A touchless access control system is configured to provide configurable selective access to an area to users in possession of a smartphone or other user device. On-site components of the system are configured to operate entirely offline, and utilize the capabilities of the user device to perform any required communications over the internet. The system also operates without any required pre-configuration of the user device, so users are able to utilize the system without first installing proprietary software or creating user accounts. The system may also be configured by a facility administrator to allow varying levels of selective access filtering based on determinable characteristics of the user device. The system also generates valuable data describing the flow through and use of facilities to which access is controlled.

15 Claims, 5 Drawing Sheets

(56) References Cited

U.S. PATENT DOCUMENTS

| | | | |
|---|---|---|---|
| 2014/0136652 A1* | 5/2014 | Narayanaswami | H04W 4/029 709/217 |
| 2014/0254896 A1* | 9/2014 | Zhou | G07F 17/13 705/16 |
| 2015/0294286 A1* | 10/2015 | Grote | G06Q 20/322 705/13 |
| 2016/0328903 A1* | 11/2016 | Roberts | G07C 9/00912 |
| 2018/0337782 A1* | 11/2018 | Wu | H04L 63/06 |
| 2018/0365914 A1* | 12/2018 | Chiu | G07C 9/20 |
| 2019/0102962 A1* | 4/2019 | Miller | G07C 9/00309 |
| 2020/0012245 A1* | 1/2020 | Marin Pulido | G06K 7/1417 |
| 2020/0410797 A1* | 12/2020 | Gomez Santamaria | G07C 9/00912 |
| 2021/0235891 A1* | 8/2021 | Derosa | G06Q 20/326 |
| 2021/0258165 A1* | 8/2021 | Woo | G06F 21/45 |
| 2021/0258721 A1* | 8/2021 | Di Saverio | H04W 4/024 |
| 2021/0390811 A1* | 12/2021 | Learmonth | H04L 63/0442 |
| 2022/0044506 A1* | 2/2022 | Dewey | G07C 9/215 |
| 2022/0051513 A1* | 2/2022 | Schmidt | G07C 9/00896 |
| 2022/0051514 A1* | 2/2022 | Schmidt | G06Q 20/3276 |
| 2022/0068078 A1* | 3/2022 | Schmidt | G07F 17/12 |
| 2022/0084338 A1* | 3/2022 | Mitris | G07C 9/21 |
| 2022/0114635 A1* | 4/2022 | Sumida | G06Q 50/30 |
| 2022/0172202 A1* | 6/2022 | Wedmore | G06Q 20/3278 |
| 2022/0300596 A1* | 9/2022 | Spencer, III | G06F 21/6254 |
| 2022/0383681 A1* | 12/2022 | Dallimore | G07C 9/00912 |
| 2022/0406111 A1* | 12/2022 | Doyon | G06F 16/9554 |
| 2022/0406112 A1* | 12/2022 | Calleberg | G07C 9/00698 |
| 2023/0047608 A1* | 2/2023 | Trösch | H04L 63/102 |
| 2023/0146126 A1* | 5/2023 | Sarkisian | G07F 9/006 700/232 |
| 2023/0154260 A1* | 5/2023 | Osborn | G07C 9/22 340/5.61 |
| 2023/0177904 A1* | 6/2023 | Galano | G06Q 50/12 340/5.73 |
| 2023/0186708 A1* | 6/2023 | Heller | G07C 9/29 235/382 |
| 2024/0005296 A1* | 1/2024 | Stankoulov | G06Q 20/363 |
| 2024/0054839 A1* | 2/2024 | Bosua | G01N 33/4972 |

* cited by examiner

ACCESS AND USE CONTROL SYSTEM

PRIORITY

This application claims the priority of U.S. Provisional Patent Application 63/288,242, filed Dec. 10, 2021, and titled "Touchless Access Control System," the entire disclosure of which is incorporated herein by reference.

FIELD

The disclosed technology pertains to a system for controlling and providing access to areas within a facility.

BACKGROUND

It is desirable that facility operators be able to control access to certain areas of a facility by having locked doors or other physical controls at key locations. This may include areas that are accessed only be certain employees, but may also include areas that are generally accessible to the public, such as a restroom in a grocery store. While conventional approaches to providing access in such settings include distributing physical keys or codes upon a verbal request, such approaches are not convenient or ideal and have a number of weaknesses.

What is needed, therefore, is an improved system for provide selective access control.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
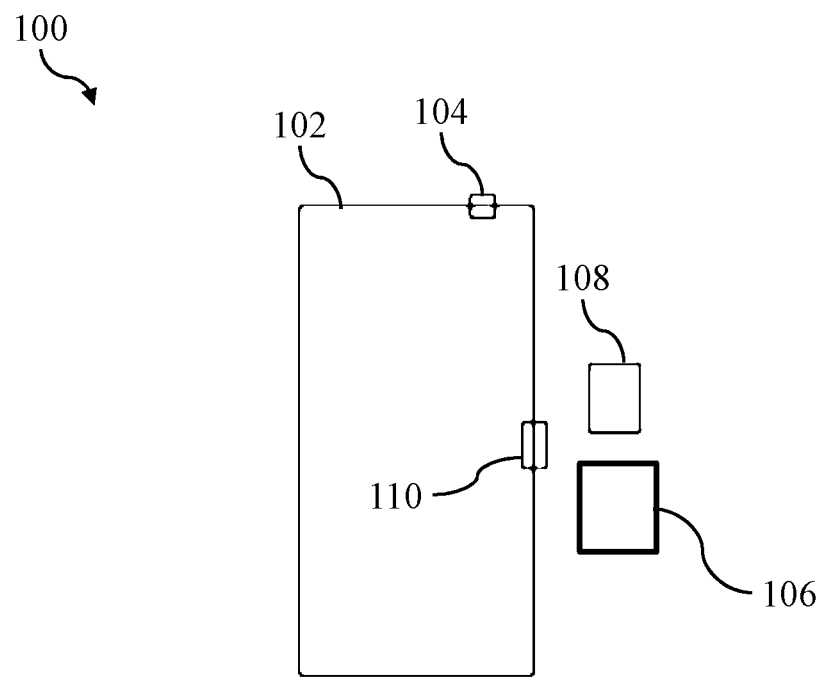
FIG. 1 is a schematic diagram of an exterior side of a door configured for touchless access.

The inventors have conceived of novel technology that, for the purpose of illustration, is disclosed herein as applied in the context of touchless access controls. While the disclosed applications of the inventors' technology satisfy a long-felt but unmet need in the art of touchless access controls, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

The disclosed technology advantageously allows for access control for a door or other barrier that provides a configurable level of selectivity dependent upon a smartphone or other user device in the possession of the person requesting access. Advantages of varying implementations of the system may include: (i) no requirement for proprietary software installation (e.g., mobile applications, credential wallets or apps), (ii) no user account creation (e.g., users can receive selective access while remaining anonymous), (iii) configurable hybrid of access controls that allow for control to be both selective and permissive, (iv) generation of usage data related to controlled areas that can also maintain anonymity of users if so desired, and (v) minimized requirements for on-site hardware and capabilities (e.g., the system may operate offline/locally, which allows for flexibility in installation at desired locations within a facility and offline function in the event of local internet outages), among other advantages.

One implementation of the system includes a local identifier and a credential reader that are positioned at a door. The credential reader is configured to (itself, or by communication with a locally connected device) authenticate a received credential and signal a locally connected automatic door opener or automatic door lock to operate, thereby giving access through the nearby door. While the credential reader and other locally connected devices may benefit from internet connectivity, it is not required as the configurations for authenticating credentials may be configured at the time of installation or maintenance and stored locally and offline.

A user wishing to access the controlled area user a smartphone or other similar user device to interact with the local identifier near the door. This may include using a camera of the device to capture a QR code, barcode, or other optical code presented by the local identifier, or using an NFC or other wireless transceiver to capture a wireless signal emitted by the local identifier, for example. When the user device receives data associated with the local identifier, it is interpreted as a web location that may be requested and accessed by a web browser configured on the device. When the web location is loaded, a remote server identifies the location for which access is being requested based on the request from the browser, and then generates and/or provides a corresponding, semi-unique access credential that may be displayed via the web browser (e.g., as a QR code, barcode, or other optical code) or as an NFT or other wireless signal that may be transmitted based upon a user interaction with the web browser.

As an example, at a grocery store GS1 having a door D1, the local identifier may be a QR code that provides the string "https://www.example.com/GS1D1" to the user device when scanned. When the user devices loads the URL, the remote server identifies the store location GS1 and the door D1 based on the http request. The remote server identifies a valid credential for that store and door (e.g., a credential that the credential reader is able to validate based on locally stored data) and provides that valid credential to the user device via the browser, which may then display or transmit that credential. In some implementations, more complex datasets may be encoded in local identifiers, may be encrypted and/or further encoded to obfuscate their precise contents, or may include parameters or attributes associated and passed with web requests, for example.

Where the credential reader is itself an optical imaging device, a displayed optical credential may be presented to the credential reader, scanned, and locally validated, and then access may be granted through the local door (e.g., by automatically opening the door or disengaging an automated lock, for example). Similarly, in other implementations, a transmitted wireless signal may be received by the credential reader and acted upon similarly.

There are numerous advantages to implementations of the above. Significantly, the system may operate offline, utilizing only the connectivity of the transient user device which is being used to request access. As a result, significant portions of the system do not need to be connected to the internet, or to other preexisting networks or systems within the facility, and will also continue to operate where such preexisting systems or dedicated internet channels fail—so long as the user device itself maintains connectivity.

Of further significance, the system utilizes conventional components and software available on substantially every smartphone or mobile user device and does not require the installation of proprietary system specific software, or proprietary user accounts. This makes use of the system very low friction for users, as compared to systems that require installing dedicated software from an app marketplace, creating user accounts, providing personal information, etc.

Of further significance, the system is highly configurable while providing a mix of selective and permissive controls. At minimum, a user must have a user device with a camera and internet connectivity—meaning that children and others who would not typically possess such a device might need the assistance of a parent or facility worker in order to gain access. Use of the system may also be nearly entirely anonymous, with only a user's IP address being visible to the system in some implementations—this allows the user to be comfortable in their privacy, while also providing data that may, in circumstances where it is warranted (e.g., investigation of a crime) provide a path to determining the identity of the user device. Configurable aspects of the access control may include limiting access for suspicious activity (e.g., a device having the same IP address accessing the controlled area multiple times within a certain time period may be blocked), limiting access at certain times (e.g., outside of normal business hours for the facility, access may be disabled for most user devices), white labeled access lists (e.g., IP addresses or other unique information of employee user devices may be white listed for access at all times), black labeled access lists (e.g., IP addresses or other unique information for problematic users may be black listed to prevent access at any time), or capacity controls (e.g., the system may be configured to prevent access based upon a number of users presently within the controlled area, as may be determined by an occupancy sensor or entry/exit sensor).

Figure 6:
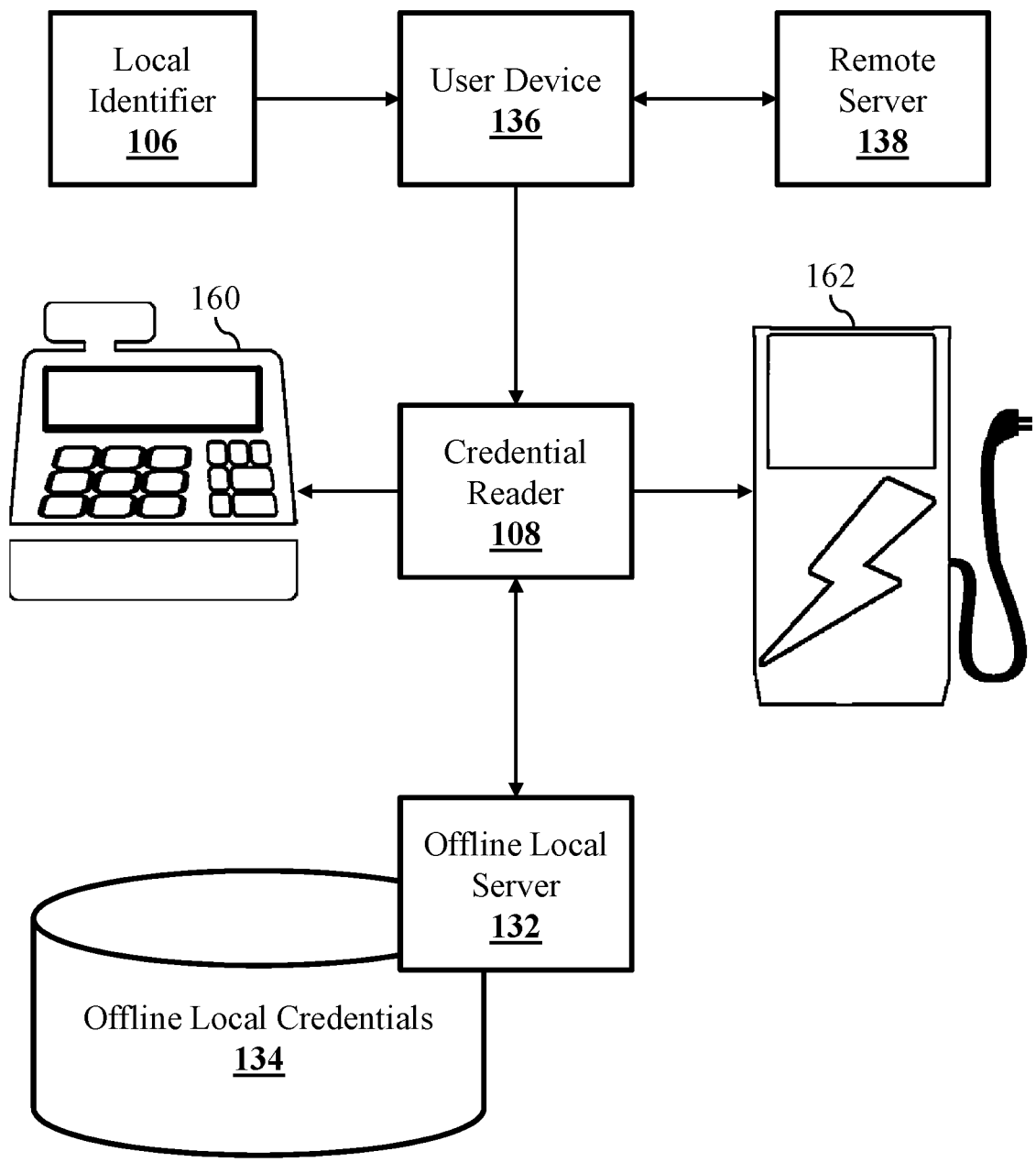
FIG. 6 is a schematic diagram of a system configured to provide authentication and/or access for an attached system or device.

Turning now to the figures, FIG. 1 is a schematic diagram of an exterior side (100) of a door (102) configured for touchless access. The door (102) may be an access door providing entry to a restroom, dressing room, or other room or area, or in some implementations may be a door or cover for a storage locker or other item storage compartment or enclosure. While the example of FIGS. 1 and 2 show a door (102), it should be understood that the disclosed system may be configured and implemented in varying ways to provide more generalized access or use to a room or resource, and so in some implementations the disclosed technology may lack a door (102), and may instead enable or activate and make usable a resource such as an electric vehicle charger (e.g., as illustrated in FIG. 6), smartphone or device charging station, internet access point, etc.

A credential reader (108) configured to read or receive access requests (e.g., in the form of optical codes or wireless communications) from a user device and a local identifier (106) that may be interacted with by the user device to generate an access request are located proximate to the exterior side of the door. The credential reader (108) may be, for example, a camera, optical code reader, or other optical code scanner configured to capture and data from barcodes, QR codes, or other optically encoded data structures, or may be a wireless communicator configured to receive communication signals from a user device via Bluetooth, RFID, NFC, or other wireless communication. The local identifier (106) may be, for example, a physical placard with a permanent printed/embossed QR code or other optical code, or a physical placard with a permanent embedded or surface attached RFID, NFC, or other wireless communicator tag. A door contact sensor (104) indicates whether the door (102) is currently open or closed. An electric strike (110) is operable, based on signals from the credential reader (108), to provide or prevent access through the door (102).

In some implementations, a digital version of the local identifier (106) may be used that may be, for example, an LED display that is configured to display a sequence of local identifiers from a pre-configured sequence (e.g., a different local identifier once per day, or once per week, etc.). In either case, the local identifier (106) may be scanned or read by a user device (e.g., a smartphone) in order to generate an access request on the user device (e.g., displaying a QR code via the display, transmitting an RFID, NFC, or other wireless signal via a wireless transceiver) that may be provided to the credential reader (108) to request access, as will be described in more detail below. A digital local identifier (106) advantageously provides the ability to cycle the currently active local identifier, which may prevent users from storing or saving a permanent and unchanging local identifier (e.g., such as by taking a photo of a physical QR code, or saving and storing a received signal from a physical RFID or NFC tag).

Figure 2:
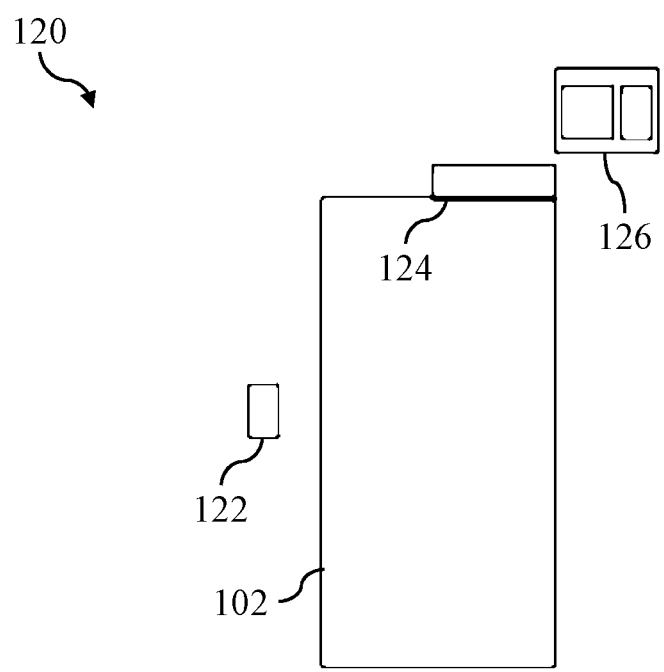
FIG. 2 is a schematic diagram of an interior side of a door configured for touchless access.

FIG. 2 is a schematic diagram of an interior side (120) of a door, such as the door (102) depicted in FIG. 1, configured for touchless access. An exit sensor (122) on the interior side of the door (102) may be interacted with (e.g., by waving a hand or walk in front of a motion sensor) to allow exit from the controlled area. Where present in a particular implementation, a door opener (124) may be operable, based on signals from the credential reader (108) and/or the exit sensor (122), to automatically open the door (102) and provides touch free access to and from the controlled area. An equipment enclosure (126) may include power, circuitry to enable operation of the door opener (124) and strike plate (110), occupancy sensors, and additional components within a protective housing to prevent damage or tampering.

Figure 3:
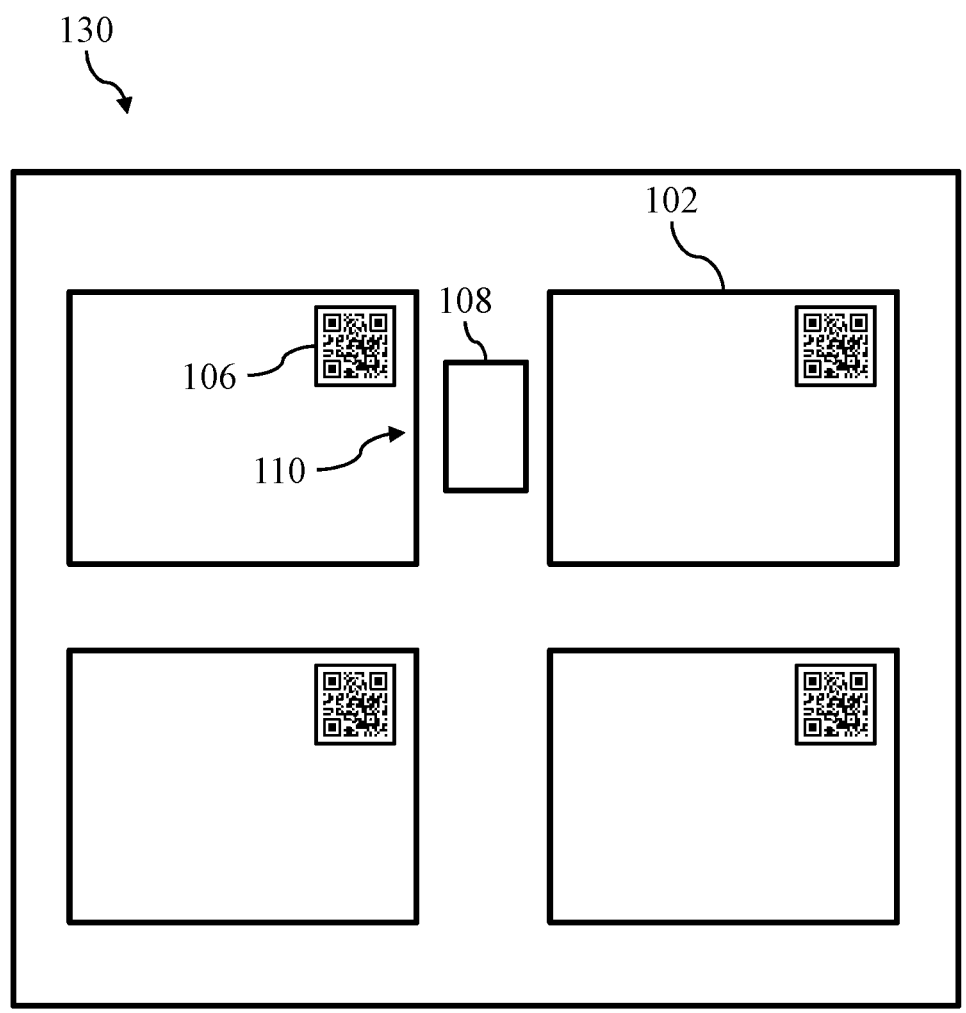
FIG. 3 is a schematic diagram of an exterior side of a storage locker with multiple storage areas configured for access control.

FIG. 3 is a schematic diagram of a variation on the system of FIGS. 1 and 2 that is configured as a storage locker (130) that includes multiple individual doors (102) that provide and control access to a storage locker, such as may be used to store items at a gym or other location, to store groceries that have been pre-purchased for later pickup by a purchaser, or by a delivery or other service that will deliver the items to a purchaser, for example. In the example of FIG. 3, a set of four lockers are shown, with each locker having a door (102) and a local identifier (106) that is depicted in this example as a scannable QR code. A credential reader (108) may be mounted on or near the locker (130), and is in communication with a strike plate (110) of each door to enable automatic locking and unlocking of the door (102). While not depicted, each locker may also have a door opener (124) that is configured to operate an electric motor or other actuator to open and close the door automatically, as has been described above. As with the example of FIGS. 1 and 2, a user may read the local identifier (106) for a particular locker with a smartphone or other user device to generate access request information on the user device (e.g., display of an optical code, wireless transmission of an access signal), and the access request information may then be read by the credential reader (108) that is configured to authenticate the request and operate the strike plate (110) of the appropriate door (102) to provide access.

Figure 4:
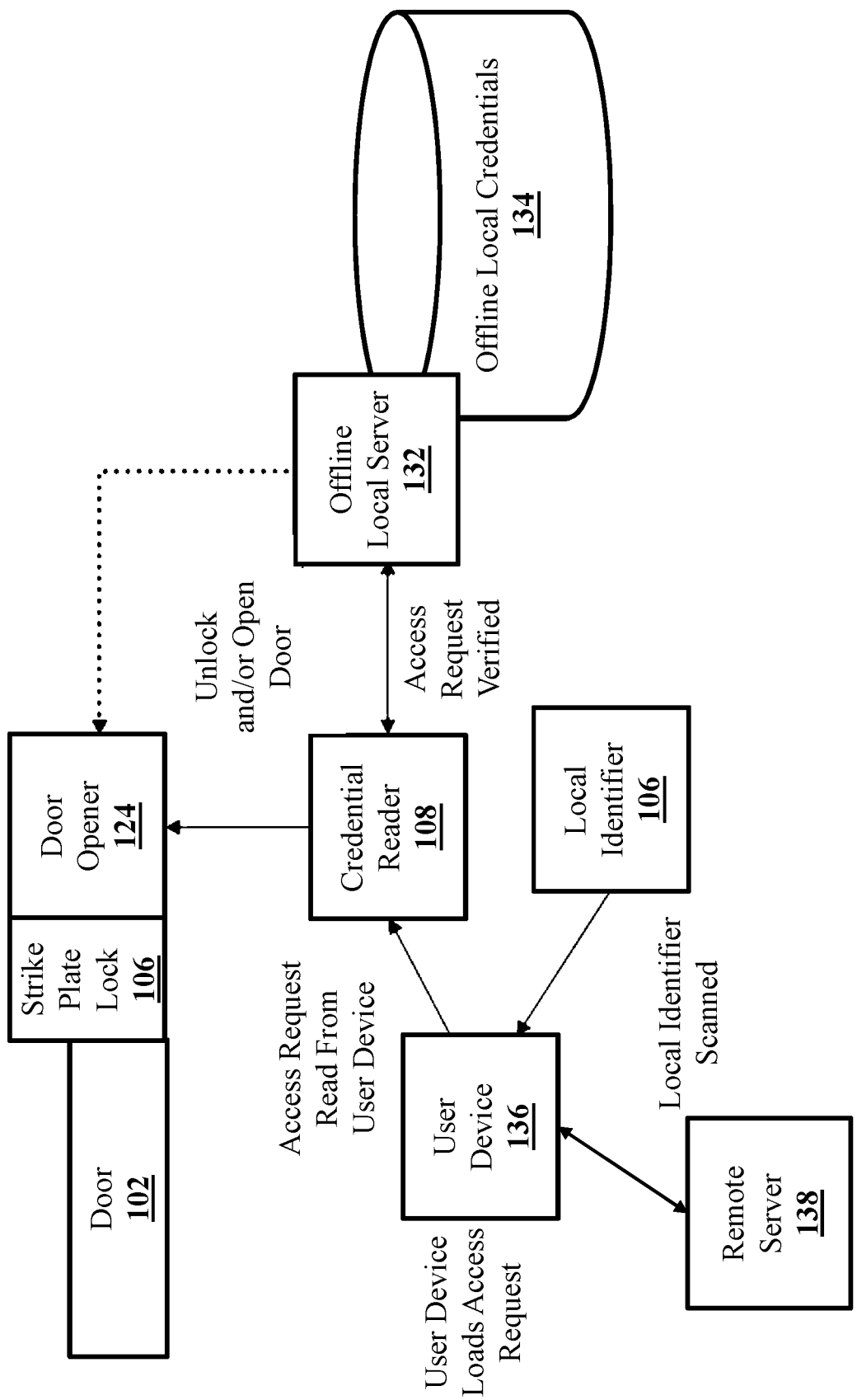
FIG. 4 is a schematic diagram of a system configured to provide touchless access management for devices such as those of FIGS. 1-3.

FIG. 4 is a schematic diagram and workflow of a system configured to provide touchless access management with device such as those of FIGS. 1-3. A user device (136), which may be a smartphone or other computing device, is used to scan a local identifier (106) (e.g., capture an image of or data from a QR code or other optically encoded data, receive an RFID, NFC, or other wireless signal), causing the user device (136) to load a website or web location, or receive information via a software application or other communication interface, from a remote server (138). The loaded website or other received information provides or presents an access request or access credential specific to the door for which access is being requested, which may be determined based upon the information from the local identifier and/or a GPS or other location information provided by the user device (136).

The user device (136) then presents or provides the access credential to the credential reader (108) (e.g., as a displayed optical code or QR code, transmitted as an RFID, NFC, or other wireless signal), which receives the credential and verifies the authenticity of the credential based upon locally stored credential information (134) of a local server or computing device (132). In some implementations, the information may be stored on an offline local server (132) that has no internet access (e.g., the offline local credentials (134) and/or logic for verifying credentials are provisioned and stored on the device at the time of install), or intermittent internet access (e.g., offline local credentials (134) and/or logic for verifying credentials are stored on the device and may be refreshed, updated, or replaced from time to time when internet connectivity is possible).

Where the server is entirely offline, the stored logic for validating the credential may be a validation function that is able to validate properly created and encoded access requests from the user device (136), or may be a comparison to a list of known, pre-determined valid credentials or access requests that may be received from a user device (136). Lists of credentials, or logic for validating credentials may be configured on the system (e.g., the offline local server (132) and/or credential reader (108)) at the time of installation, or may be transmitted to the system from time to time during maintenance (e.g., a maintenance user device may wirelessly transmit updated hardware when it is located proximately to the offline system, or an intermittently online system may receive intermittent updates when possible). In some implementations, the offline local server (132) may be integrated with or a component of the credential reader (108). Once the credential or access request is validated as authentic, the system signals an automatic door opener (124) and/or electronic strike (106) to cause the door to be unlocked and/or opened to provide access to the controlled area.

Figure 5:
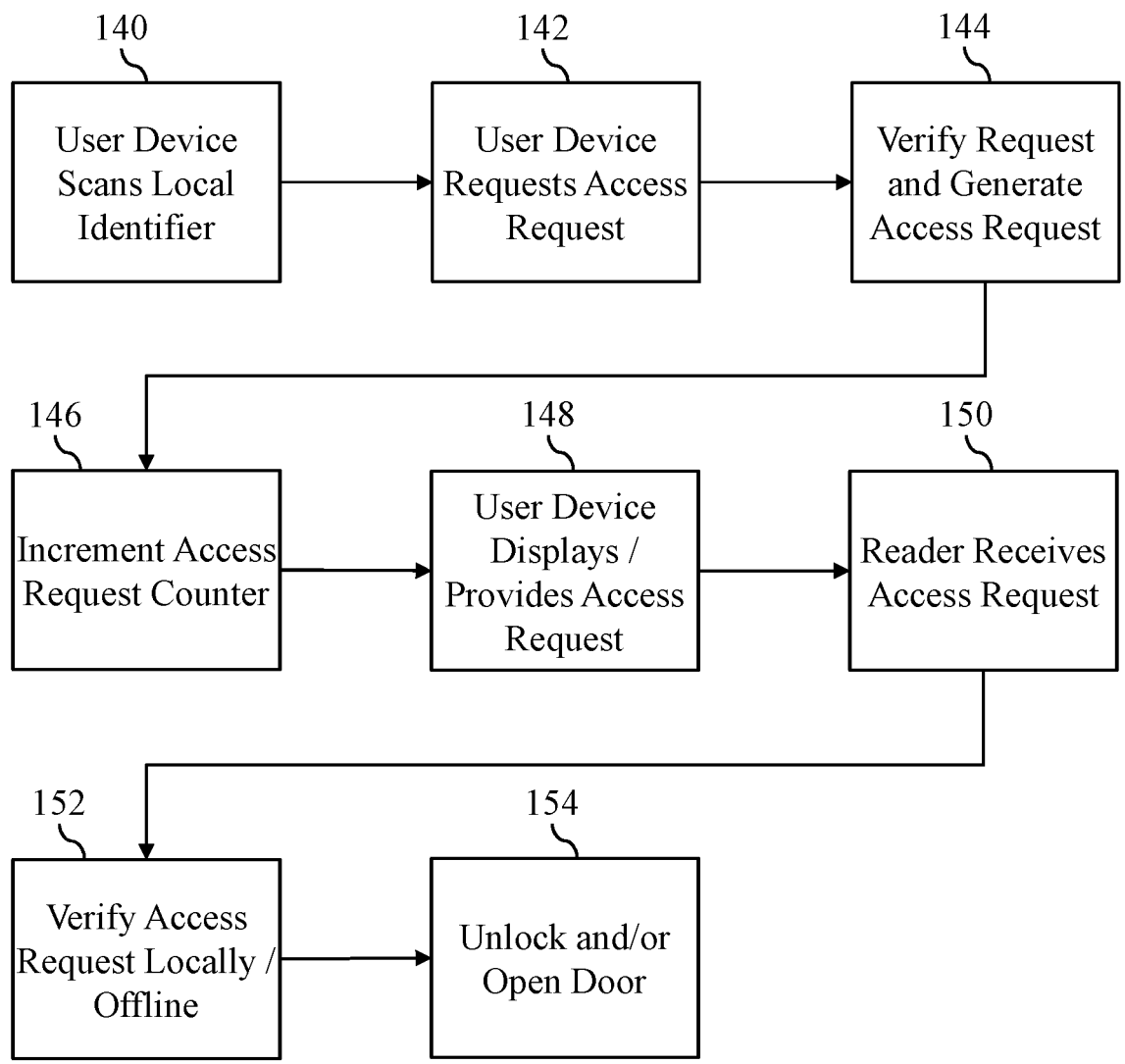
FIG. 5 is a flowchart of a set of steps that could be performed with a system to manage touchless access.

FIG. 5 is a flowchart of a set of steps that could be performed with a system to manage access to doors, rooms, areas, storage lockers, and in other scenarios such as those described above. A user device scans (140) a local identifier and requests (142) an authentication page or access information from a remote server based on the local identifier. The remote server validates (144) the request and then generates and provides a credential to the user device. Requests may be invalidated based on configurable filters or other access controls (e.g., suspicious or frequent requests from the same user device, where the controlled area is only open during certain hours, etc.), where the provided local identifier is not valid or enabled for access control, where a user associated with the user device does not have a valid subscription or other association required for access, or where a user associated with the user device does not have the right to access the requested area (e.g., a shopper that has pre-purchased groceries or other goods that are stored in a locker (130) may be validated for access to the locker(s) in which their groceries are stored, but may be invalid for access to other lockers).

The system may also increment (146) an authentication code or access request counter that tracks how many credentials have been provided for a particular facility and a particular door. The counter may be incremented by the remote server each time a credential is requested and generated, and may also be configured to apply certain filtering/de-duplication rules in order to maintain an accurate count. For example, repeat requests from a recognized IP address or device might be excluded within a certain time frame, in order to prevent abuse or manipulation of the credential generation counter. As another example, requests for accessing a location that are paired with user device location data that does not match the location may be filtered as erroneous/suspicious requests.

Upon receiving the response to the authentication page request, the user device may display (148) the access request (e.g., a QR code or other optical code via a touchscreen display), and/or may cause or provide a user control to cause the user device to transmit information wirelessly (a wireless signal via an RFID, NFC, or other wireless transmission), or may otherwise provide or present (148) the generated credential to the credential reader. The credential reader receives (150) the access request from the user device (136) and verifies (152) it based upon locally available credential validation functions or lookup tables and, where the credential is valid, transmits (154) a signal causing the door to unlock and/or automatically open. Provided (148) access requests may be encoded and/or encrypted, and may include various information such as arbitrary or other keys or identifiers used during local verification (152), identifying information from the user device (136) such as an IP address, MAC address, or other information, attributes or configurations related to the requested access (e.g., such as payment information or limitations, as will be described in more detail below), and other information.

FIG. 6 is a schematic diagram of an exemplary system configured to provide authentication and/or access for an attached system or device. The system of FIG. 6 shares some components with the system of FIGS. 1-4, such as a local identifier (106) positioned on or near the device for which authentication and access is provided, and configured to be read by a user device (136). As with prior examples, the user device (136) may communicate with a remote server (138) to receive or create an access request dataset, which may include an optical code displayable by the user device (136), or data encoded for wireless transmission by the user device (136). A credential reader (108) is configured to read or receive the access request dataset provided by the user device (136), validate and determine the effect of the access request using a local server (132) and local credential validation logic and/or credential sets, as has been described.

However, rather than operating a door lock or opener of a door or storage locker, the system of FIG. 6 is configured such that the credential reader (108) is communicatively coupled to a system or device for which authentication and/or access control is being provided, such as a point of sale system (160) or an electric vehicle charger (162). In each case and in other examples, the connected device or system may be associated with a local identifier (106) positioned on or near the device (e.g., such as a QR code positioned near other payment options in a cashier lane or other point of sale (160), or a QR code mounted on the front of the charger (162)).

With reference to FIG. 5, the steps shown and described in that figure and elsewhere are substantially similar from the time of scanning (140) the local identifier with a user device (136) until the credential reader (108) receives (150) the access request from the user device (136). Such steps and subsequent steps performed by the system may vary based upon the particular system or device with which the system is integrated.

For example, with reference to the point of sale system (160), the user may scan (140) a local identifier positioned in a cashier lane or other payment location, and such local identifier uniquely identifies the vendor or other party to which payment is being provided. A remote server may verify (144) that the recipient party is valid based on the identifier, and may also determine one or more payment related settings or configurations associated with the user device and user (e.g., preferred payment options, transaction limits, etc.). When valid and allowed, the remote server provides an access request dataset to the user device, which displays or provides (148) an encoded version of the access request dataset that is readable by the credential reader (108). For a payment transaction, this may include payment details for an electronic payment card, bank account, or other payment method, which may be encrypted and/or encoded into an optical code or wirelessly transmitted signal received by the credential reader (108), as has been described. Once received, the credential reader (108) may locally authenticate the dataset and, where valid, may provide information or instructions to the point of sale system (160) that is usable to complete the payment transactions.

As another example, with reference to the charger (162), the user may scan (140) a local identifier positioned on or near the charger (162) and such local identifier uniquely identifies the charger (162) and/or operator of the charger from which access and use for charging an electronic vehicle is being requested. A remote server may verify (144) that the identifier is valid and associated with a charger (162), and may also validate that the requesting user device and user have valid access to use that charger (162) (e.g., this may include verifying records or data that indicate the user has a subscription to charging services, or has pre-purchased charging services, or has configured or provided a payment method that may be charged for use of charging services). When valid and allowed, the remote server provides an access request dataset to the user device, which displays or provides (148) an encoded version of the access request dataset that is readable by the credential reader (108) at the charger (162). Once received, the credential reader (108) may locally authenticate the dataset as has been described and, where valid, may provide information or instructions to the charger (162) that are configured to cause the charger (162) to activate or become operational by the user for a period of time (e.g., until the user indicates they are done charging, or some other limitation where the access request dataset includes a limitation on maximum charging time or electric consumption).

In some implementations, the unique and unconventional characteristics of the above disclosed systems may be utilized to provide further flexibility in access controls. As an example, browser cookies may be utilized within the above descriptions to store semi-unique information on a user device to provide persistent state data across multiple uses of the user device, which could be useful in many ways. As one example, state data on historic access requests may be stored in a cookie to more easily categorize a user device as a unique user device—this persistent data would allow the user device to be identified as a past user device even where its IP address or other information changes or is reassigned. As another example, the system may require the presence of certain cookie data on the device in order for subsequent requests for access to function as has been described. Thus, before interacting with the credential reader near the door, the user may first be required to interact with a facility administrator or other personnel in order to scan a QR code in that person's possession. This QR code may cause a unique cookie to be created and stored on the device, and only when this unique cookie data is present will subsequent interactions with the local identifier provide a valid credential. Cookie data may also be used to blacklist particular users (e.g., a user determined to be abusing the system and/or controlled areas may, on a subsequent scan, receive unique cookie that prevents future access) or whitelist particular users (e.g., an employee user device may have unique cookie data that provides permissive/unrestricted access). Cookie data may also be used to prevent counting of duplicate credential requests (e.g., a credential may be stored in or associated with cookie data, such that subsequent credential requests within a time period in which the cookie remains valid/unexpired will not count as new credential requests, and may instead use the same credential for access).

While the local identifier has been described as being near the door and credential reader for which it is usable, it may also be advantageously located in other associated locations in addition to, or instead of being located proximate to the door. As an example, the QR code or other identifier may be located at a customer service desk, cashier counter, or other location within the facility. As another example, the QR code or other identifier, or the QR code or other output presenting the credential, may be presented via a mobile application. In this manner, general users may access the area via a local identifier near the door, while employees or other customers that have pre-configured access may access the area directly without needing/interacting with a proximally located local identifier. As yet another example, the QR code or other identifier may be presented via a vehicle display or related interface. For example, a vehicles integrated navigation software and display, or a standalone navigation device, may assist a user in locating a restroom, parking spot, short term rental, or other access controlled resource, and upon arriving at the access controlled resource may display the local identifier so that the driver may scan the local identifier and request an access credential after arriving, and before exiting their vehicle and proceeding to the door.

The disclosed system retrofits an existing single occupancy restroom to allow for a completely touchless user experience. Primary system features include: Touchless Automatic Door, Virtual Queueing, and Secure Digital Access Credential. It is assumed these retrofits will be located within operational businesses. Some Installations may require removal and replacement of the door, frame, and lock. The system is intended to be installed on any existing single occupancy ADA compliant restroom in good working order, preferably with all touchless fixtures.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system comprising:
   (a) a plurality of local identifiers associated with a resource and configured to communicate with a user device to provide at least one of the plurality of local identifiers to the user device;
   (b) a credential reader associated with the resource and configured to communicate with the user device to receive an access request dataset from the user device;
   (c) a plurality of access control devices that are selectively operable by the credential reader to prevent or provide access to the resource;
   (d) a local processor that is communicatively coupled to the credential reader, and configured to access a local validation dataset stored by a local memory; and
   (e) a remote server that is communicatively coupled to the user device;
   wherein the remote server is configured to:
     (i) receive a local identifier dataset from the user device that includes at least one of the plurality of local identifiers, and determine whether an access request for the resource is valid based on the local identifier dataset; and
     (ii) where the access request for the resource is valid, provide an access request dataset to the user device, wherein the access request dataset is configured to cause the user device to present at least a portion of the access request dataset to be received by the credential reader;
   wherein the remote server does not require:
     (i) that the user device be associated with any pre-configured account for accessing the resource in order to provide the access request dataset to the user device; and
     (ii) that the user device be configured with any software application other than a web browser application in order to receive the local identifier dataset from the user device
   wherein the local processor is configured to:
     (A) receive at least a portion of the access request dataset from the user device and via the credential reader, and determine whether the access request for the resource is locally valid based on at least a portion of the access request dataset and the local validation dataset; and
     (B) where the access request for the resource is locally valid, operate the access control device to provide access to the resource;
   wherein the resource comprises a plurality of storage compartments each uniquely associated with one of the plurality of the local identifiers, and the plurality of the access control devices, and wherein each storage compartment is accessed via a door that is coupled to one of the plurality of access control devices; and wherein the credential reader and the local processor are not communicatively coupled to the internet.

2. The system of claim 1, wherein at least one of the plurality of local identifiers comprises a physical placard positioned proximately to the resource that includes an optical code that is based on the local identifier dataset, and is configured to be read by a camera of the user device to provide the local identifier dataset.

3. The system of claim 1, wherein the access request dataset is configured to cause the user device to display an optical code that includes at least a portion of the access request dataset and configured to be read by a camera of the credential reader to provide the at least a portion of the access request dataset to the credential reader.

4. The system of claim 1, wherein the resource is accessed via a door, and at least one of the plurality of access control devices comprises an automated door lock that is selectively operable to lock or unlock the door.

5. The system of claim 4, wherein at least one of the plurality of access control devices comprises an automatic door opener that is selectively operable to open or close the door.

6. The system of claim 1, wherein the remote server is further configured to:
   (a) store a plurality of user records that each identify a user, and associate the user with valid access for one or more of the plurality of storage compartments; and
   (b) when determining whether the access request is valid based on the local identifier dataset:
     (i) identify the user associated with the access request based on a user identifier of the local identifier dataset;
     (ii) identify a compartment of the plurality of storage compartments based on the local identifier; and
     (iii) determine that the access request is valid where the identified user is associated with the identified compartment in the plurality of user records.

7. The system of claim 1, wherein:
   (a) the local validation dataset comprises a plurality of access credentials;
   (b) the access request dataset provided to the user device comprises an access credential that is contained within the plurality of access credentials; and
   (c) the local processor is further configured to determine that the access request is locally valid where the access credential is contained within the plurality of access credentials.

8. The system of claim 1, wherein:
   (a) the local validation dataset comprises an access credential validation algorithm;
   (b) the access request dataset provided to the user device comprises an access credential that is created based upon the access credential validation algorithm; and
   (c) the local processor is further configured to determine that the access request is locally valid using the access credential as input to the access credential validation algorithm.

9. The system of claim 1, wherein:
(a) the user device communicates with the remote server via a web browser application configured on the user device; and
(b) the user device presents the at least a portion of the access request dataset as an optical code displayed on a display of the user device.

10. A method comprising:
(a) configuring a resource with an access control system, the access control system comprising:
  (i) a plurality of local identifiers associated with a resource and configured to communicate with a user device to provide at least one of the plurality of local identifiers to the user device;
  (ii) a credential reader associated with the resource and configured to communicate with the user device to receive an access request dataset from the user device; and
  (iii) a plurality of access control devices that are selectively operable by the credential reader to prevent or provide access to the resource;
(b) with a remote server:
  (i) receiving a local identifier dataset from the user device that includes at least one of the plurality of local identifiers, and determining whether an access request for the resource is valid based on the local identifier dataset; and
  (ii) where the access request for the resource is valid, providing an access request dataset to the user device, wherein the access request dataset is configured to cause the user device to present at least a portion of the access request dataset to be received by the credential reader;
(c) with a local processor:
  (i) receiving at least a portion of the access request dataset from the user device and via the credential reader, and determining whether the access request for the resource is locally valid based on at least a portion of the access request dataset and a local validation dataset stored by a local memory; and
  (ii) where the access request for the resource is locally valid, operating at least one of the plurality of access control devices to provide access to the resource;
wherein the resource comprises a plurality of storage compartments each uniquely associated with one of the plurality of the local identifiers, and the plurality of the access control devices, and wherein each storage compartment is accessed via a door that is coupled to one of the plurality of access control devices; wherein the remote server does not require that the user device be associated with any pre-configured account for accessing the resource in order to provide the access request dataset to the user device; wherein the remote server does not require that the user device be configured with any software application other than a web browser application in order to receive the local identifier dataset from the user device; and wherein the credential reader and the local processer are not communicatively coupled to the internet.

11. The method of claim 10, wherein at least one of the plurality of local identifiers comprises a physical placard positioned proximately to the resource that includes an optical code that is based on the local identifier dataset and configured to be read by a camera of the user device to provide the local identifier dataset.

12. The method of claim 10, wherein the access request dataset is configured to cause the user device to display an optical code that includes at least a portion of the access request dataset and configured to be read by a camera of the credential reader to provide the at least a portion of the access request dataset to the credential reader.

13. The method of claim 1, further comprising:
(a) storing a plurality of user records that each identify a user, and associating the user with valid access for one or more of the plurality of storage compartments;
(b) determining whether the access request is valid based on the local identifier dataset by:
  (i) identifying the user associated with the access request based on a user identifier of the local identifier dataset;
  (ii) identifying a compartment of the plurality of storage compartments based on at least one of the plurality local identifiers; and
  (iii) determining that the access request is valid where the identified user is associated with the identified compartment in the plurality of user records.

14. The method of claim 10, wherein:
(a) the local validation dataset comprises a plurality of access credentials;
(b) the access request dataset provided to the user device comprises an access credential that is contained within the plurality of access credentials; and
(c) the method further comprises determining that the access request is locally valid where the access credential is contained within the plurality of access credentials.

15. The method of claim 10, wherein:
(a) the local validation dataset comprises an access credential validation algorithm;
(b) the access request dataset provided to the user device comprises an access credential that is created based upon the access credential validation algorithm; and
(c) the method further comprising determining that the access request is locally valid using the access credential as input to the access credential validation algorithm.

* * * * *